United States Patent [19]

Tietze

[11] Patent Number: 5,669,851

[45] Date of Patent: Sep. 23, 1997

[54] AUTOMATIC GEAR CHANGE CONTROL METHOD FOR A MOTOR VEHICLE AUTOMATIC DISCRETE STEP GEARBOX

[75] Inventor: Frank Tietze, Stuttgart, Germany

[73] Assignee: Mercedes-Benz AG, Germany

[21] Appl. No.: 625,892

[22] Filed: Apr. 1, 1996

[30] Foreign Application Priority Data

Mar. 31, 1995 [DE] Germany ............ 195 11 996.7

[51] Int. Cl.⁶ .................................................. B60K 41/04
[52] U.S. Cl. .................................................. 477/109; 477/154
[58] Field of Search ............................... 477/107, 109, 477/110, 154, 155; 364/424.1

[56] References Cited

U.S. PATENT DOCUMENTS

| | | | |
|---|---|---|---|
| 5,046,383 | 9/1991 | Butts et al. | 477/154 X |
| 5,058,460 | 10/1991 | Hibner et al. | 477/154 |
| 5,079,970 | 1/1992 | Butts et al. | 477/109 X |
| 5,133,227 | 7/1992 | Iwatsuki | 477/110 |
| 5,307,711 | 5/1994 | Kimura et al. | 477/109 |
| 5,407,401 | 4/1995 | Bullmer et al. | 477/100 |
| 5,462,501 | 10/1995 | Bullmer et al. | 477/155 |
| 5,475,595 | 12/1995 | Asahara et al. | 477/109 X |
| 5,476,425 | 12/1995 | Shiraishi et al. | 477/109 |
| 5,547,437 | 8/1996 | Kamada et al. | 477/155 X |
| 5,551,931 | 9/1996 | Matsumoto | 477/155 X |
| 5,580,332 | 12/1996 | Mitchell et al. | 477/154 X |

FOREIGN PATENT DOCUMENTS

| | | |
|---|---|---|
| 0 644 361 A1 | 3/1995 | European Pat. Off. . |
| 0 654 623 A2 | 5/1995 | European Pat. Off. . |
| 1 344 971 | 1/1974 | United Kingdom . |

*Primary Examiner*—Charles A. Marmor
*Assistant Examiner*—Peter T. Kwon
*Attorney, Agent, or Firm*—Evenson, McKeown, Edwards & Lenahan, P.L.L.C.

[57] ABSTRACT

A method for the control of a gear change of an automatic discrete step gearbox of a motor vehicle superimposes a regulation of the gearbox input rotational speed during a rotational speed adaptation phase on a control of the transmission torque of a frictional connection. A required deceleration value is specified as a function of a deceleration torque to be brought about by the frictional connection.

2 Claims, 6 Drawing Sheets

AUTOMATIC GEAR CHANGE CONTROL METHOD FOR A MOTOR VEHICLE AUTOMATIC DISCRETE STEP GEARBOX

BACKGROUND AND SUMMARY OF THE INVENTION

The present invention relates to a method for controlling a gear change in an automatic discrete step gearbox of a motor vehicle, in which a first engageable and disengageable frictional connection is associated with an old gear and a second engageable and disengageable frictional connection is associated with a new gear between associated gearbox elements. A controller for working pressures actuates the first and second frictional connections participating in the gear change.

In particular, the method includes the steps of providing a rotational speed adaptation phase within a gear-changing period; measuring the rotational speed adaptation phase from the appearance of a gear-changing signal which initiates the beginning of control of the working pressures to attainment of a rotational speed value of a gearbox input rotational speed associated with the new gear; in the rotational speed adaptation phase either reducing to zero or controlling to a low constant value near zero a transmission torque of one frictional connection; controlling a transmission torque, which determines a variation of the gearbox input rotational speed, of the other frictional connection to an adaptation value; controlling, at a beginning of the rotational speed adaptation phase, the transmission torque determining the variation of the gearbox input rotational speed to a current value of torque of the gearbox input shaft with the gearbox input rotational speed having the value associated with the old gear, and ending the rotational speed adaptation phase when the gearbox input rotational speed has reached a value associated with the new gear.

Patent Application P 44 32 850.8–12, which is not a prior publication, describes a method which controls the gear-changing conditions, i.e. two steady-state and two transient gear-changing conditions, occurring during the gear change with respect to the working pressure in the two clutches using only one electromagnetic control valve which can be activated by an electronic control unit.

DE 43 23 037 A1 describes a vehicle automatic gearbox with a frictional element which is driven by a conduit pressure. In this automatic gearbox, a control system is provided in which correction values for the conduit pressure are determined from a concluded gear change by an adaptation method and are used for controlling the conduit pressure for the subsequent gear changes. This known control system has a first device for detecting a transmission ratio which is made available by the gearbox; a second device for measuring an inertia phase retention period which, starting from the time when a change in the transmission ratio is initiated, extends to the time when the change is concluded; a third device for setting the conduit pressure to match the inertia phase retention period taking account of a first predetermined time; a fourth device for measuring an inertia phase initial period which, starting from the release of a gear-change instruction, extends to the time when the change to the transmission ratio is introduced; a fifth device for increasing the conduit pressure independently of the condition of the third device if the inertia phase initial period exceeds a second predetermined period; and a sixth device for suppressing the mode of operation of the fifth device even in the case where the inertia phase initial period exceeds a third predetermined period which is greater than the second predetermined period and no change to the transmission ratio appears.

The rotational speed adaptation phase, in which the gearbox input rotational speed is adapted from the old to the new gear transmission ratio, is of decisive importance in gear changes of automatic discrete step gearboxes. On one hand, good jolt-free gear-changing comfort should be achieved by correspondingly longer clutch slip but, on the other hand, the frictional connections (clutches or brakes) must not be overheated. Difficulties arise, in particular, because the actual variation of the gearbox input rotational speed is only adjusted with a delay relative to the control of the working pressures. This delay results from the delay in the electrohydraulic control and in the mechanical system. In addition, a delay due to the recording of the gearbox input rotational speed by the electronic control results. Even if there are no deviations present, therefore, deviations are recognized in the electronic control system and corrections are carried out. This leads to working-pressure overshoots and therefore, in the end, also to overshoots in the vehicle acceleration at the beginning and end of the gear change.

In order to improve the control quality in controlled systems with originally larger delays, it is known (Dubbel "Taschenbuch für den Maschinenbau", 17th Edition, Springer-Verlag Berlin, Heidelberg, New York, London, Paris, Tokyo, Hong Kong, Barcelona, 1990, Page X13) that additional devices can shorten the signal paths for action on the controlled system. If, on one hand, the controlled variable can be influenced within the system, an additional auxiliary variable could, thereby, avoid proportions of the total delay within the system, which is broken down into part systems. If, on the other hand, the disturbing effect can already have been recognized unambiguously within the system, an auxiliary controlled variable could, if necessary, additionally influence the manipulated variable by an auxiliary reference variable. Here again, the advantage would likewise lie in avoiding proportions of the total delay. If, finally, a disturbance variable which can be recorded by measurement technology acts unambiguously on the controlled variable, a disturbance variable effect could directly and additionally influence the manipulated variable in the sense of a control. These known additional devices would, however, in the case of an application in a known method, all lead in the end to the above-mentioned overshoots of the working pressure in the rotational speed adaptation phase of the gear-change control.

An object of the present invention is to provide a method for adapting the required variation of the gearbox input rotational speed to the delays of the system in order to permit better control of the gear-changing time with respect to the requirements in terms of gear-changing comfort and the avoidance of overheating.

The foregoing object has been achieved in an advantageous manner in accordance with the present invention by a method wherein, in the rotational speed adaptation phase, a delay regulation is superimposed on control of the transmission torque determining the variation of the gearbox input rotational speed such that a required value for the control of the transmission torque is determined by a correction value which is formed from the deviation of the actual value of the gearbox input rotational speed by a required deceleration value of the gearbox input rotational speed. The required value of the transmission torque is formed from a deceleration torque, from the gearbox input torque and from the transmission torque under the conditions such that (1) $p\_K\_soll * C\_Kzu = M\_Kzu$ for change-up operations, (2) $p\_K\_soll*C\_Kab=M\_Kab$ for release gear changes, (3) the transmission torque determining the variation of the gearbox input rotational speed
$=M\_Kzu=M\_Mot*\mu+M\_J$ for change-up operations, and
$=M\_Kab=M\_Mot*\mu+M\_Kzu-M\_J$ for release gear changes, (4) a torque converter step-up ratio $\mu$ is determined from a torque converter characteristic with the parameters $n\_Mot$ and $n\_T$, and (5) a deceleration torque $M\_J$ is determined as a function of parameters comprising engine torque $M\_Mot$ and gearbox output rotational speed $n\_Getr\_aus$, and that the required deceleration value is formed from a required value of the gearbox input rotational speed, from the deceleration torque $M\_J$, from the mass moment of inertia I of the rotating masses and taking account of at least one delay time under conditions such that $$(6) \quad \frac{d(n\_T\_soll)}{dt} = \frac{M_J}{2*\pi*I},$$

and (7) the deceleration torque $M\_J$ is determined as a function of parameters such as the gearbox output rotational speed $n\_Getr\_aus$ and the engine torque $M\_Mot$, and (8) a delay element is arranged either before or after an integrating element for the formation of the required value, In lieu of conditions (7) and (8), (9) the deceleration torque $M\_J$ is determined from the required value determined by the correction value and from the torque of the gearbox input shaft, where (10) a required value for the transmission torque is equal to $M\_K\_soll\_verz=p\_K\_soll*C\_Kzu$ for change-up operations, and (11) $M\_K\_soll\_verz=p\_K\_soll*C\_Kab$ for release gear changes, and (12) $M\_J=M\_K\_soll\_verz-M\_Mot*\mu$, and (13) a proportional element for formation of a delayed required value of the transmission torque in accordance with one of the conditions (10) and (11) is arranged before or after a delay element.

In the method according to the invention, the behavior of the control of the working pressures is substantially improved during the rotational speed adaptation phase because the activation and recording delays are taken into account. For this purpose, the required variation of the gearbox input rotational speed is determined with an appropriate delay. The required variation is determined from the current required deceleration torque $M\_J$. This is obtained from the transmission torques $M\_Kzu$ and $M\_Kab$ of the frictional connections, the engine torque $M\_Mot$ and the torque converter ratio $\mu$.

A distinction is made between change-up operations, in which the engine is decelerated by the engaging frictional connection (for example changing-up under traction), and "release gear changes" in which the engine changes its rotational speed due to the opening of the disengaging frictional connection. In the case of change-up operations, the deceleration torque $M\_J$ is calculated from $M\_J=M\_Kzu-M\_Mot*\mu$. In the case of release gear changes, the deceleration torque is calculated from $M\_J=M\_Mot*\mu-M\_Kab+M\_Kzu$.

The delay in the required rotational speed variation takes place by signal filtering. The filter can be of relatively simple configuration. A simple dead period or a first order delay element appears sufficient. The filtering can be introduced at various points in the control. The required variation can be initially determined and subsequently delayed by a filter. Otherwise, the deceleration torque is filtered and the required variation is formed using the filtered signal. Finally, the pressure variations and the engine torque can be filtered. The clutch torques are determined from the filtered pressure signals. From these, together with the filtered engine torque signal, the deceleration torque and therefore the required variation are formed.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
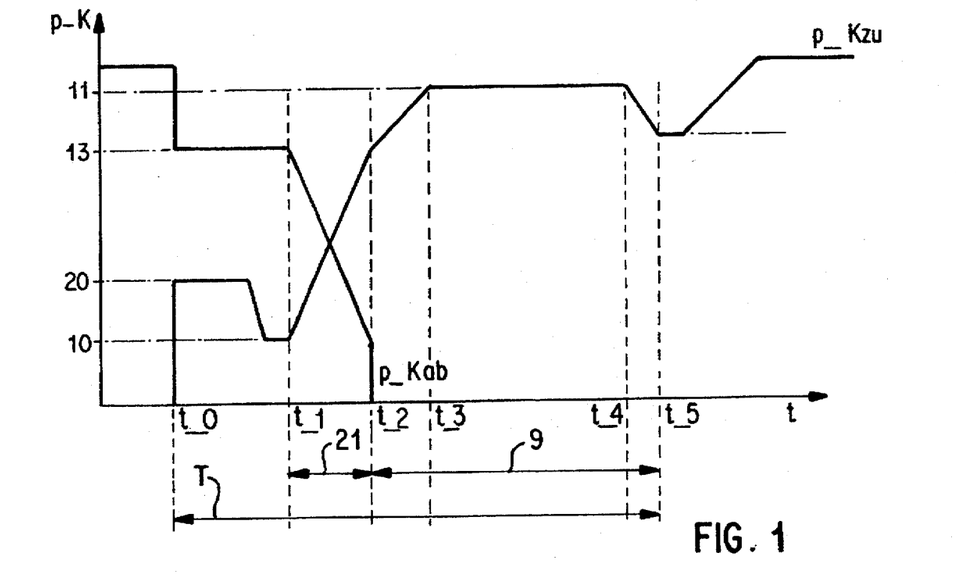
FIG. 1 comprises diagrams (a) and (b) showing the course of a known change-up operation in which diagram (a) represents the variation of the working pressures with time $t$ and diagram (b) represents the variation of the gearbox input rotational speed $n\_T$ with time $t$.
Figure 1A:
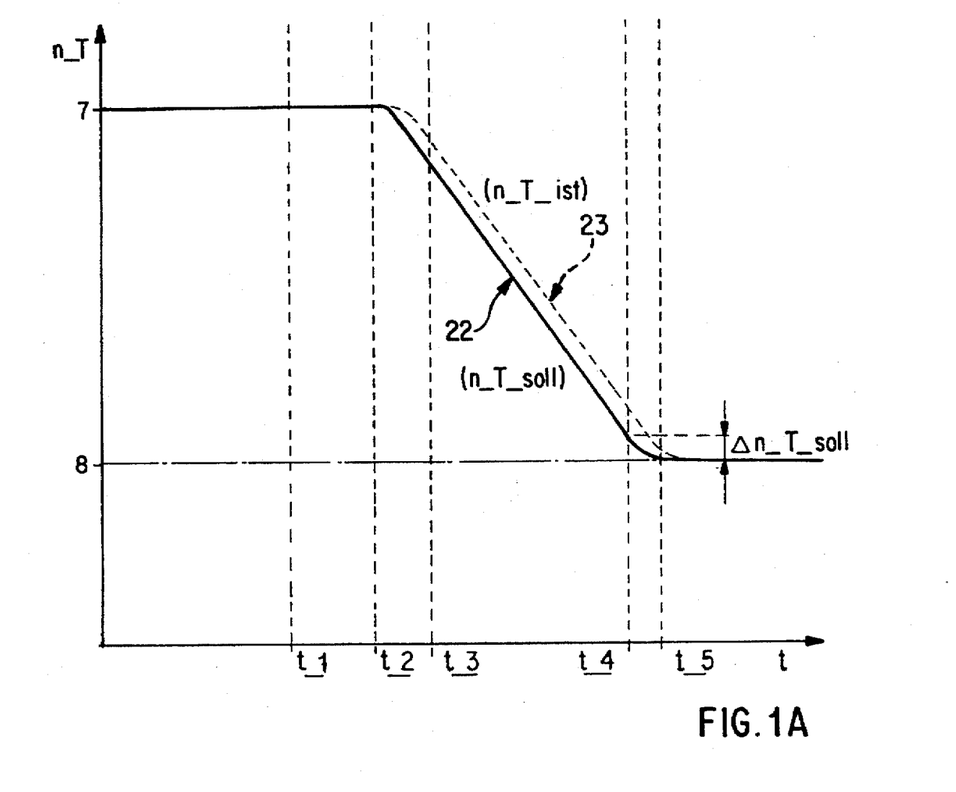

Referring to FIG. 1, on appearance of a gear-change signal at the time $t\_0$ in a change-up operation, the working pressure $p\_Kab$ of the frictional connection Kab, which is associated with the old gear and therefore has to be disengaged, is reduced from an increased safety value to a value 13 necessary for transmitting the current torque $M\_Mot*\mu$ of the gearbox input shaft, and the working pressure $p\_Kzu$ of the frictional connection Kzu, which is associated with the new gear and therefore has to be engaged, is set to a filling value 20. At the time $t\_1$, the clutch actuator of the frictional connection Kzu has been filled and the latter begins to transmit a torque on reaching the contact pressure value 10 so that the usual intersection phase 21 follows in which the working Pressures p_Kzu and p_Kab are controlled with respective ramp-shaped intersecting variations in such a way that the sum of the frictional transmission torques M_Kzu and M_Kab of the frictional connections Kzu and Kab is at least equal to the current torque M_Mot*μ of the gearbox input shaft.

At the time t_2, the frictional connection Kzu alone transmits the torque M_Mot*μ of the gearbox input shaft so that the usual rotational speed adaptation phase 9, which is being discussed here, follows, in which the working pressure p_Kab is reduced to zero and the working pressure p_Kzu is regulated to a constant adaptation value so that, as seen in diagram (b) of FIG. 1 the rotational speed n_T of the gearbox input shaft can change from the rotational speed value 7 associated with the old gear to the rotational speed value 8 associated with the new gear. This value has to be attained at the time t_5, as is given by the curve shape 22 for the required value n_T_soll of the gearbox input rotational speed n_T. As can be seen from the diagram (b) of FIG. 1, a delayed variation 23 occurs in terms of the measured actual values n_T_ist of the gearbox input rotational speed n_T so that the actual duration of the gear-changing time T is indeterminate.

Figure 2:
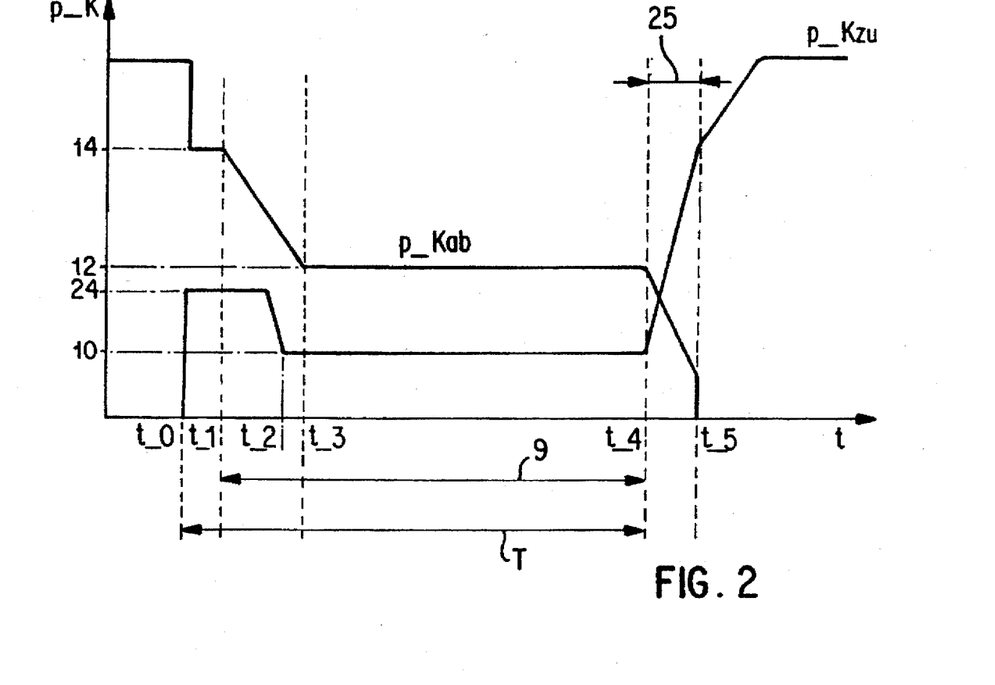
FIG. 2 comprises diagrams (a) and (b) showing the course of a known release gear change in which diagram (a) illustrates the variation of the working pressures with time $t$ and (b) illustrates the variation of the gearbox input rotational speed $n\_T$ with time $t$.
Figure 2A:
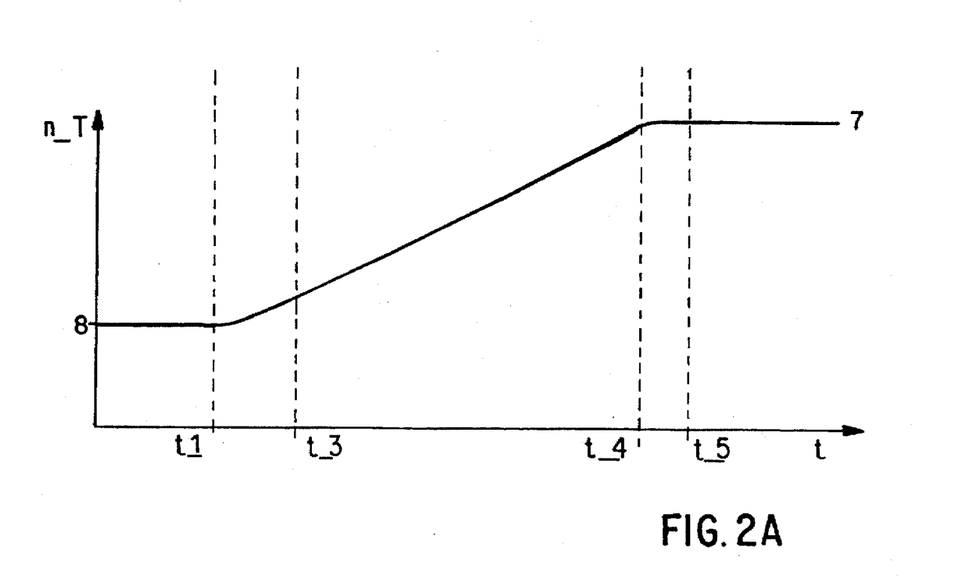

Referring now to FIG. 2, on appearance of a gear-changing signal at the time t_0 in a release gear change, the working pressure p_Kab of the frictional connection Kab, which is associated with the old gear and consequently has to be disengaged, is reduced to a pressure value 14 sufficient for transmitting the current torque M_Mot*μ of the gearbox input shaft, and the working pressure p_Kzu of the frictional connection Kzu, which is associated with the new gear, is regulated to a filling pressure value 24.

At time t_1, the working pressure p_Kab is regulated to an adaptation value 12 over a transition phase by way of a ramp function. With the beginning of the pressure reduction at the time t_1, the gearbox input rotational speed n_T also begins to change from the rotational speed value 8 associated with the old gear in the direction of the rotational speed value 7 associated with the new gear. Consequently, the rotational speed adaptation phase 9, which ends with the attainment of the rotational speed value 7 at the time t_4, also begins at the time t_1. The gear-changing period from the beginning of the open-loop or closed-loop pressure control until the attainment of the rotational speed value 7 is again T.

With the ending of the rotational speed adaptation phase 9, an intersection control 25 of the working pressures p_Kab and p_Kzu takes place in the usual manner until, at the time t_5, the frictional connection Kzu of the new gear can alone transmit the torque M_Mot*μ of the gearbox input shaft.

Figure 3:
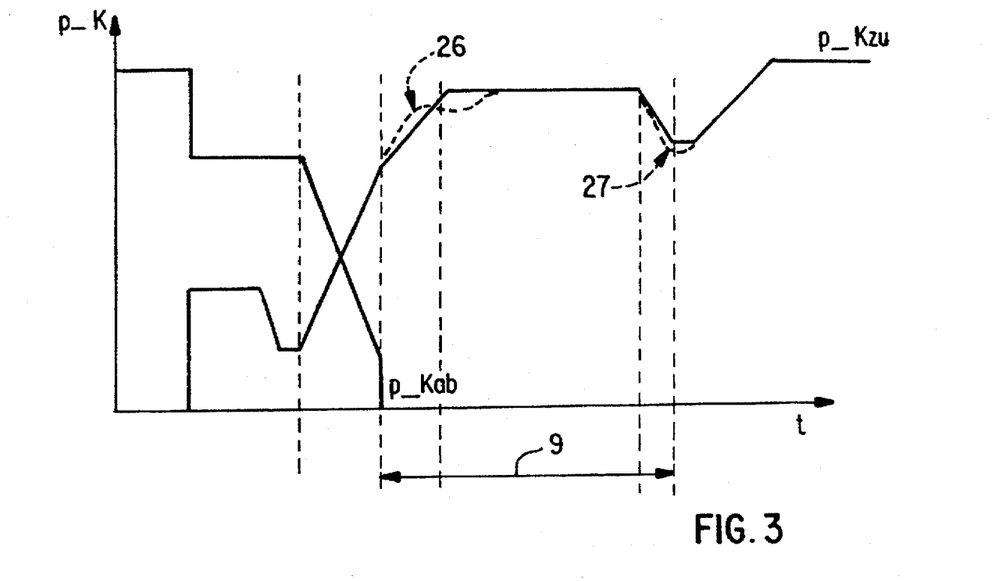
FIG. 3 comprises diagrams (a) and (b) showing the course of a change-up operation with the delays in the control line conventionally regulated out, in which diagram (a) illustrates the variation of the working pressures with time $t$ and (b) illustrates the variation of the gearbox input rotational speed $n\_T$ with time $t$.
Figure 3A:
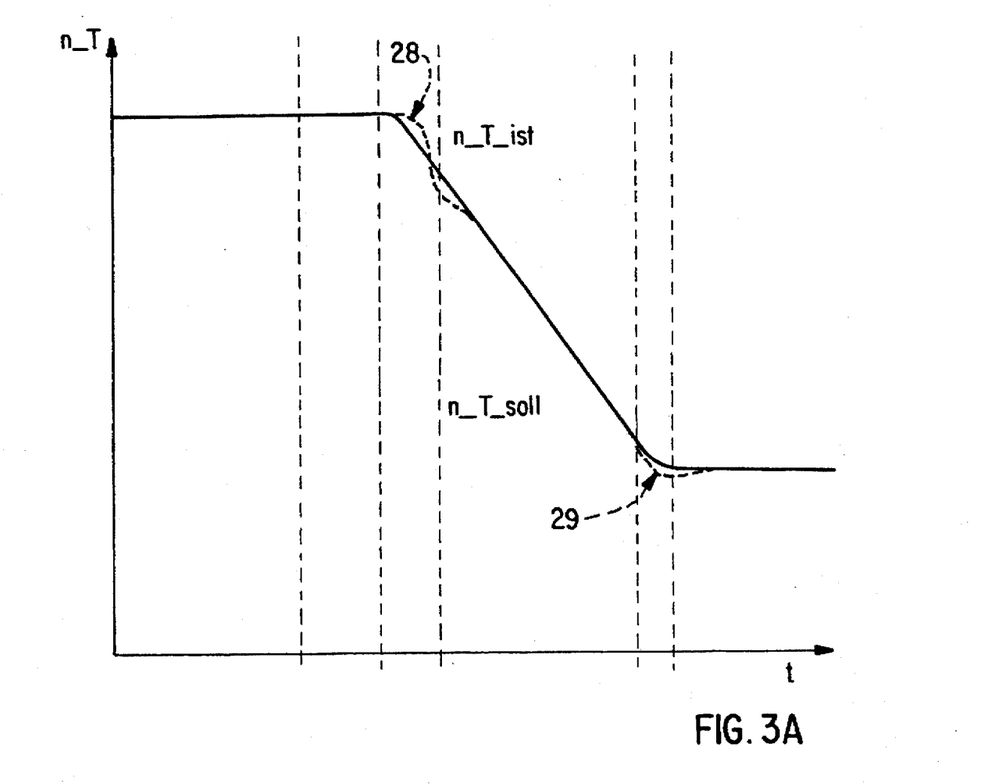

FIG. 3 shows a change-up operation in accordance with FIG. 1 in which, however, the delay in the variation of the actual rotational speed n_T_ist of the gearbox input shaft, which delay is visible in diagram (b) of FIG. 1, is regulated out in the conventional manner so that the overshoots 26 to 29 (indicated by interrupted lines in diagram (b) of FIG. 3) occur in the variation of the working pressure p_Kzu and the actual rotational speed n_T_ist of the gearbox input shaft within the rotational speed adaptation phase 9.

Figure 4:
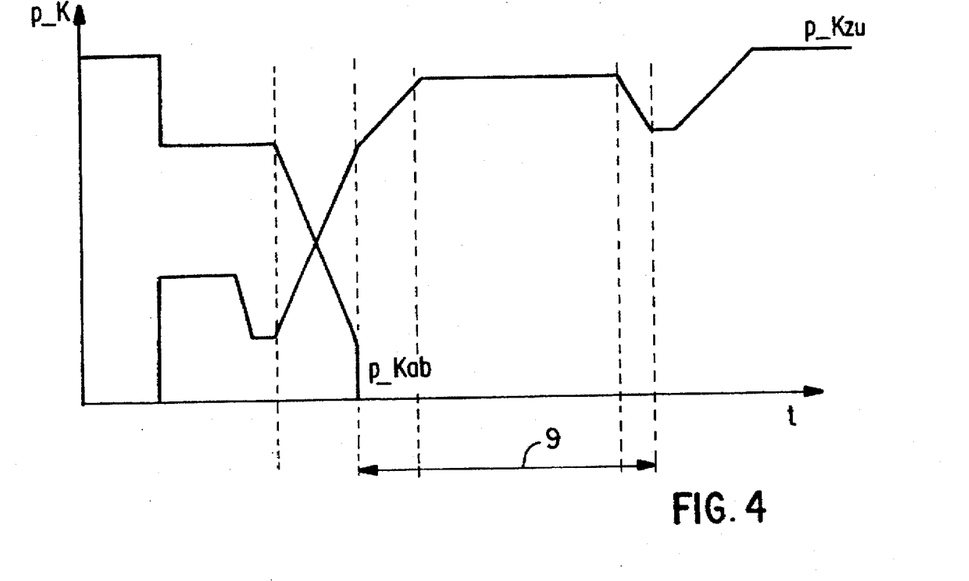
FIG. 4 comprises diagrams (a) and (b) showing the course of a change-up operation according to the present invention in which diagram (a) illustrates the variation of the working pressures with time $t$ and diagram (b) illustrates the variation of the gearbox input rotational speed $n\_T$ with time $t$.
Figure 4A:
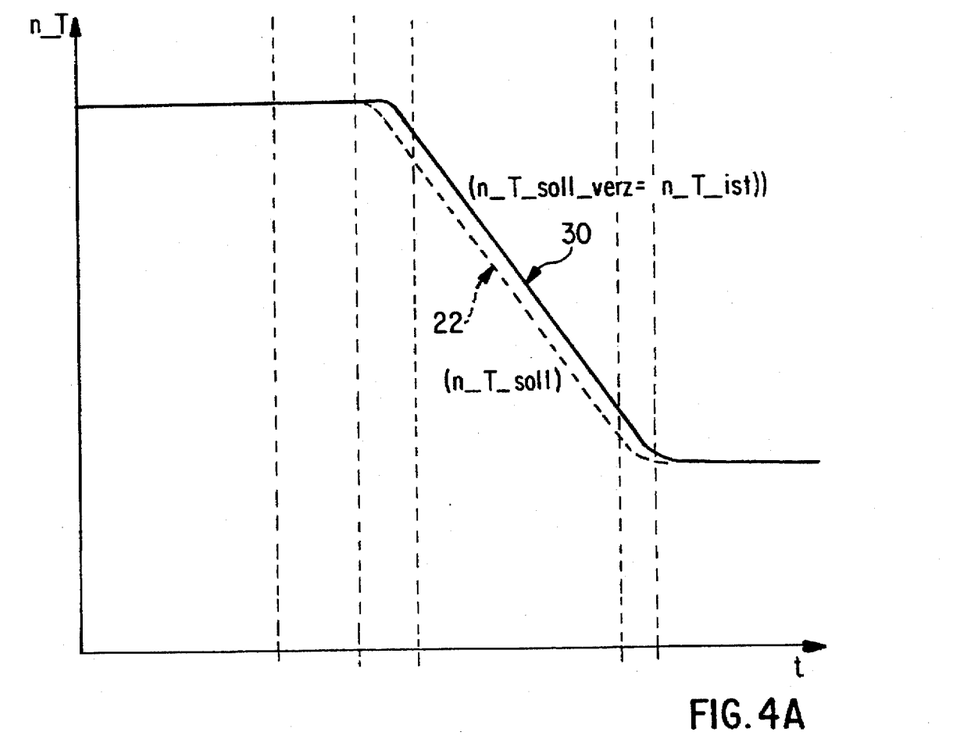

FIG. 4 shows that the required variation 30 of the gearbox input rotational speed n_T, according to the present invention, is completely adapted to the delays which occur in the case of a required variation 22 of known methods.

Figure 5:
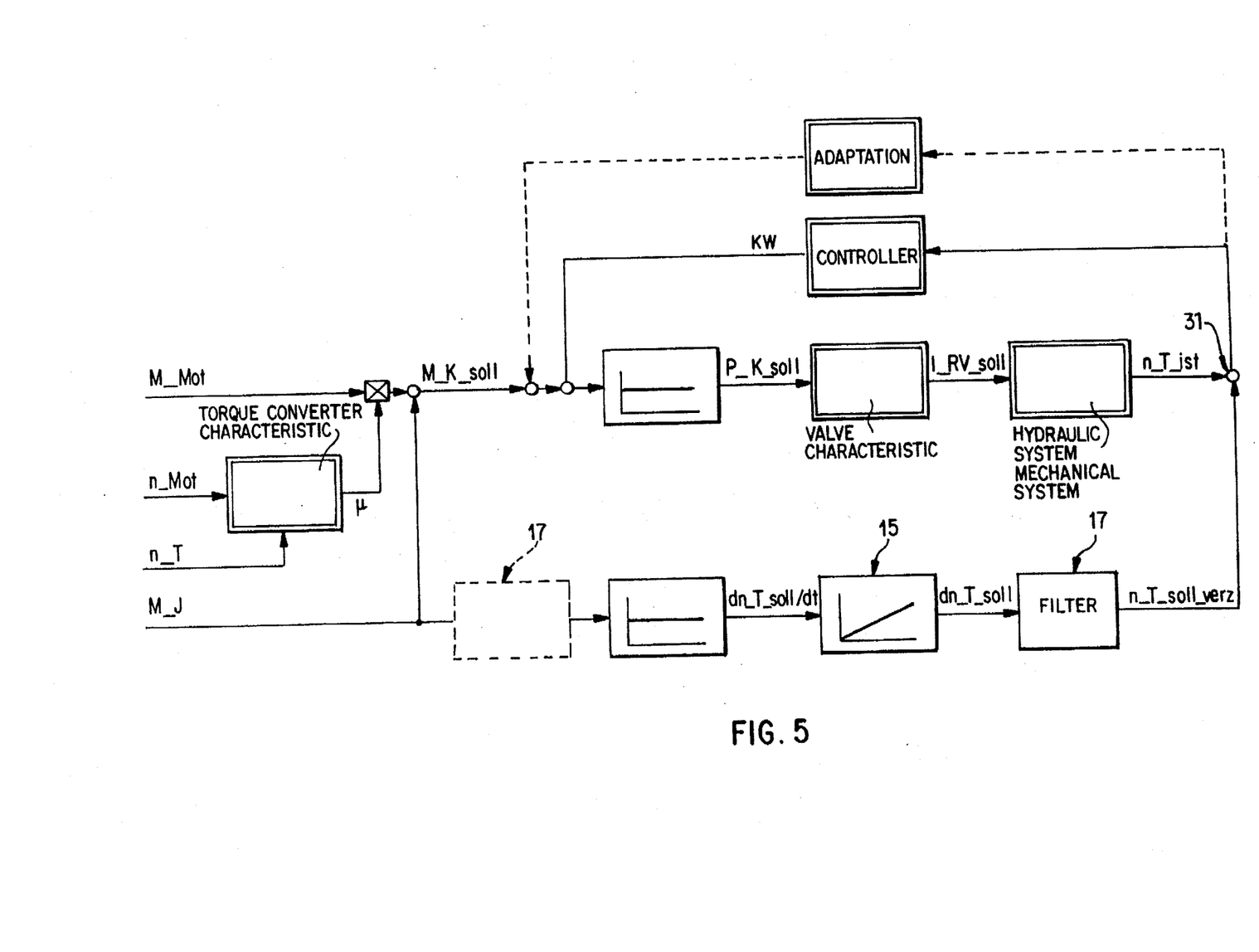
FIG. 5 is a block circuit diagram of a first embodiment for implementing the method according to the present invention for the open-loop and closed-loop control of the working pressures during the rotational speed adaptation phase of a gear change.
Figure 6:
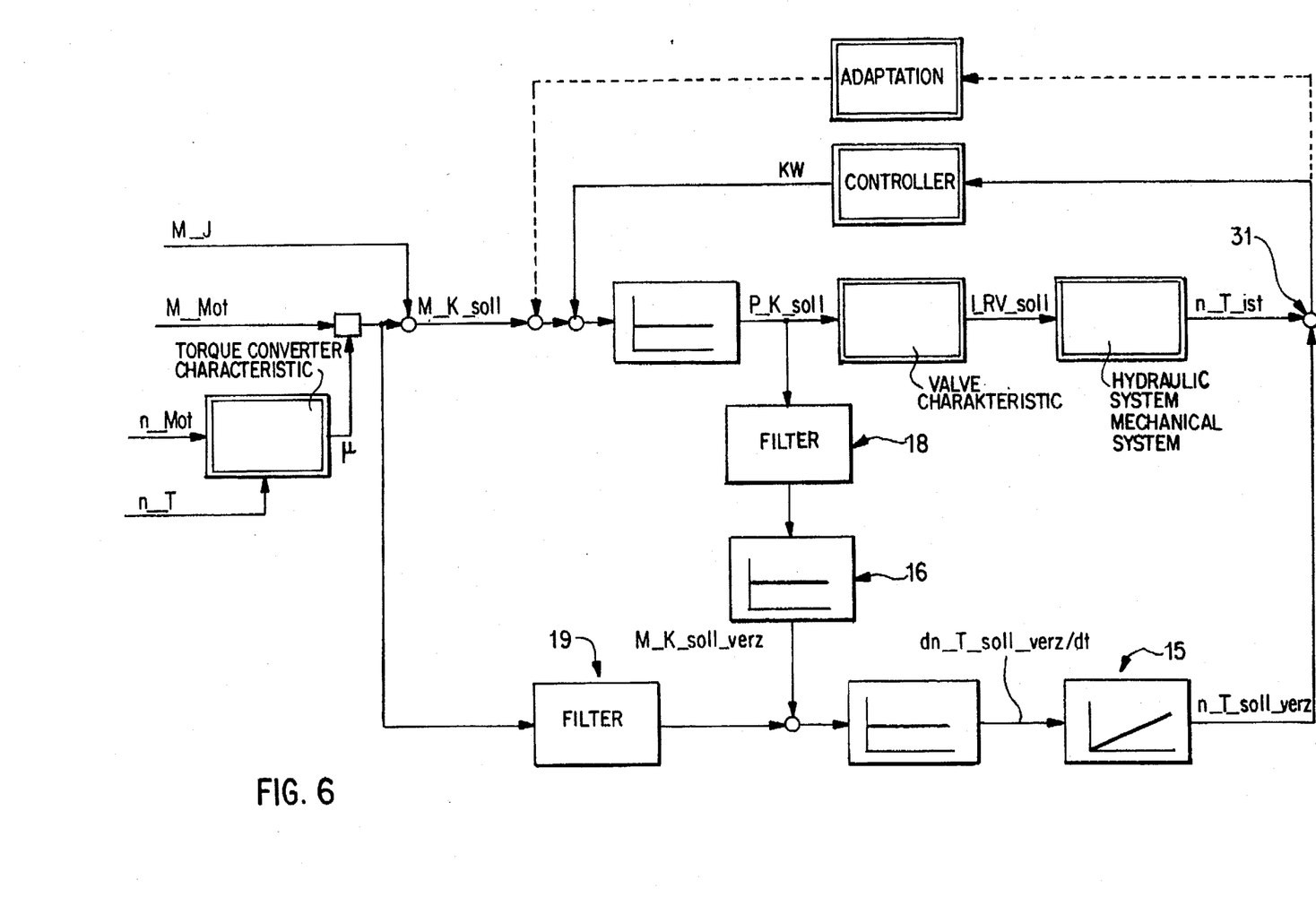
FIG. 6 is a block circuit diagram of a second embodiment for implementing the method according to the present invention for the open-loop and closed-loop control of the working pressures during the rotational speed adaptation phase of a gear change.

In the block diagrams of FIGS. 5 and 6 for carrying out the present invention, the engine torque M_Mot, the engine rotational speed n_Mot, the gearbox input rotational speed n_T and the deceleration torque M_J are processed as the input parameters in the form of signals. The torque converter step-up ratio μ is calculated from the rotational speeds n_Mot and n_T by a characteristic. The torque M_Mot*μ of the gearbox input shaft is determined from the torque converter step-up ratio μ and the engine torque M_Mot. The transmission torque M_K_soll which has to be set during the rotational speed adaptation phase 9 (corresponding to the adaptation value 11 in diagram (a) of FIG. 1 and 12 in diagram (a) of FIG. 2, is formed from the sum of M_Mot*μ and M_J in the case of a change-up operation. The necessary working pressure p_K_soll and the necessary valve current I_RV_soll can be determined from the required value M_K_soll. A rotational speed variation n_T_ist is then set by the mechanical and hydraulic systems.

The required rotational speed variation n_T_soll_verz is determined in parallel therewith. This essentially occurs by determining the rotational speed change in the current time step by way of the deceleration torque M_J. The final value of M_J is provided in a characteristic diagram as a function of the gearbox output rotational speed n_Getr_aus and the engine torque M_Mot. The rotational speed variation is provided by the summation of these changes by an integrating element 15. The essential feature of these methods may be seen in the use of one or more delay elements or filters 17 to 19. This ensures that the actually present mechanical, hydraulic and rotational speed recording systems are simulated with sufficient accuracy. A regulation for the instantaneous rotational speed adaptation phase 9 and, if need be, an adaptation for the following gear changes is superimposed on the control by a comparator 31 for comparison of the required and actual rotational speeds.

In the method of FIG. 5, the delay is achieved by filter 17 after the formation of the undelayed required rotational speed n_T_soll or by filtering (interrupted line filter 17) of the deceleration torque M_J before the formation of the required rotational speed n_T_soll.

Two filters 18 and 19 are used in the system and method of FIG. 6. Filter 18 takes account of the target working pressure p_K_soll, and the second filter 19 takes account of the current engine torque M_Mot. This method has the advantage that it is not only changes to the current deceleration torque M_J which are realistically simulated by the filter 18 in order to determine the required rotational speed n_T_soll_verz but, in addition, changes to the working pressure due to the changed engine torque and delays between the torque signal of the engine and the actual engine torque are also taken into account.

Although the invention has been described and illustrated in detail, it is to be clearly understood that the same is byway of illustration and example, and is not to be taken by way of limitation. The spirit and scope of the present invention are to be limited only by the terms of the appended claims.

What is claimed is:

1. A method for controlling a gear change in an automatic discrete step gearbox of a motor vehicle, having a first engageable and disengageable frictional connection associated with an old gear and having a second engageable and disengageable frictional connection associated with a new gear between associated gearbox elements and having a controller for working pressures for actuating the first and second frictional connections participating in the gear change, comprising the steps of providing a rotational speed adaptation phase within a gear-changing period; measuring the rotational speed adaptation phase from appearance of a gear-changing signal which initiates a beginning of control of the working pressures to attainment of a rotational speed value of a gearbox input rotational speed associated with the new gear; in the rotational speed adaptation phase one of reducing to zero and controlling to a low constant value near zero a transmission torque of one frictional connection; controlling a transmission torque, which determines a variation of the gearbox input rotational speed, of the other frictional connection to an adaptation value; controlling, at a beginning of the rotational speed adaptation phase, the transmission torque determining the variation of the gearbox input rotational speed to a current value of torque of the gearbox input shaft with the gearbox input rotational speed having the value associated with the old gear; and ending the rotational speed adaptation phase at a time at which the gearbox input rotational speed has reached a value associated with the new gear, wherein in the rotational speed adaptation phase a delay regulation is superimposed on control of the transmission torque determining the variation of the gearbox input rotational speed such that a required value for the control of the transmission torque is determined by a correction value which is formed from the deviation of the actual value of the gearbox input rotational speed by a required deceleration value of the gearbox input rotational speed, and the required value of the transmission torque is formed from a deceleration torque, from the gearbox input torque and from the transmission torque under the conditions such that (1) $p\_K\_soll*C\_Kzu=M\_Kzu$ for change-up operations, (2) $p\_K\_soll*C\_Kab=M\_Kab$ for release gear changes, (3) the transmission torque determining the variation of the gearbox input rotational speed
 $=M\_Kzu=M\_Mot*\mu+M\_J$ for change-up operations, and
 $=M\_Kab=M\_Mot*\mu+M\_Kzu-M\_J$ for release gear changes, (4) a torque converter step-up ratio ($\mu$) is determined from a torque converter characteristic with the parameters (n_Mot) and (n_T) and (5) a deceleration torque (M_J) is determined as a function of parameters comprising engine torque (M_Mot) and gearbox output rotational speed (n_Getr_aus), and that the required deceleration value is formed from a required value of the gearbox input rotational speed, from the deceleration torque (M_J), from the mass moment of inertia (I) of the rotating masses and taking account of at least one delay time under conditions such that (6) $$\frac{d(n\_T\_soll)}{dt} = \frac{M_J}{2*\pi*I},$$

(7) the deceleration torque (M_J) is determined as a function of parameters such as the gearbox output rotational speed (n_Getr_aus) and the engine torque (M_Mot), and (8) a delay element is arranged either before or after an integrating element for the formation of the required value, or, in lieu of conditions (7) and (8), (9) the deceleration torque (M_J) is determined from the required value determined by the correction value and from the torque of the gearbox input shaft, where (10) a required value for the transmission torque is equal to $M\_K\_soll\_verz=p\_K\_soll*C\_Kzu$ for change-up operations, and (11) $M\_K\_soll\_verz=p\_K\_soll*C\_Kab$ for release gear changes, and (12) $M\_J=M\_K\_soll\_verz-M\_Mot*\mu$, and (13) a proportional element for formation of a delayed required value of the transmission torque in accordance with one of the conditions (10) and (11) is arranged before or after a delay element.

2. The method according to claim 1, wherein, for condition (12), the torque of the gear input shaft is introduced with a delay.

* * * * *